(12) United States Patent
Lahcanski et al.

(10) Patent No.: US 8,581,997 B2
(45) Date of Patent: *Nov. 12, 2013

(54) SYSTEM FOR LOCATING NEARBY PICTURE HOTSPOTS

(75) Inventors: Tomi Lahcanski, Rochester, NY (US); Dustin L. Winters, Webster, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/914,310

(22) Filed: Oct. 28, 2010

(65) Prior Publication Data

US 2012/0110031 A1     May 3, 2012

(51) Int. Cl.
*H04N 5/228*     (2006.01)
*H04N 5/76*     (2006.01)
*G06K 9/00*     (2006.01)
*G06F 17/30*     (2006.01)

(52) U.S. Cl.
USPC .......... 348/222.1; 348/231.2; 348/231.3; 382/106; 707/812

(58) Field of Classification Search
USPC ............ 348/222.1, 231.2, 333.01; 707/737, 707/738, 812; 382/103
See application file for complete search history.

(56) References Cited

U.S. PATENT DOCUMENTS

| | | | |
|---|---|---|---|
| 6,847,733 B2 | 1/2005 | Savakis et al. | |
| 7,007,243 B2 | 2/2006 | Baldino | |
| 7,663,671 B2 | 2/2010 | Gallagher et al. | |
| 7,797,019 B2 | 9/2010 | Friedmann | |
| 2003/0036848 A1 | 2/2003 | Sheha et al. | |
| 2003/0144843 A1* | 7/2003 | Belrose | 704/270.1 |
| 2003/0210806 A1* | 11/2003 | YoichiShintani et al. | 382/104 |
| 2004/0230663 A1 | 11/2004 | Ackerman | |
| 2006/0089792 A1* | 4/2006 | Manber et al. | 701/207 |
| 2007/0030363 A1* | 2/2007 | Cheatle et al. | 348/239 |
| 2008/0297608 A1 | 12/2008 | Border et al. | |
| 2010/0002122 A1* | 1/2010 | Larson et al. | 348/333.01 |
| 2011/0235858 A1* | 9/2011 | Hanson et al. | 382/103 |

FOREIGN PATENT DOCUMENTS

JP     2009-187486     8/2009

OTHER PUBLICATIONS

Wei-Chao Chen et al; "Visual Summaries of Popular Landmarks From Community Photo Collections"; Signals, Systems and Computers; 2009 Conference Record of the Forty-Third Asilomar Conference On; IEEE, Piscataway, NJ, USA; Nov. 1, 2009; pp. 1248-1255.
Symeon Papadopoulos et al; "ClustTour: City Exploration by Use of Hybrid Photo Clustering"; Proceedings of the International Conference on Multimedia; MM '10; Jan. 1, 2010; pp. 1617-1620.
Keiichiro Hoashi et al; "Constructing a Landmark Identification System for Geo-tagged Photographs Based on Web Data Analysis" Multimedia and Expo; ICME 2009; IEEE International Conference On, IEEE; Piscataway, NY, USA; Jun. 28, 2009; pp. 606-609.

* cited by examiner

*Primary Examiner* — Ngoc-Yen Vu
*Assistant Examiner* — Quang Le

(57) ABSTRACT

Portable communication devices transmit digital images and their location information to a central server. If a particular location is often photographed it can be designated as a hot spot. Thereafter, if a communication device is currently transmitting from within a vicinity of the hot spot, based on the location data received from the communication device, notification data can be transmitted to the communication device for notifying the user of the hot spot. The notification data can include directional information for the user to access on the communication device for enabling the user to find the hot spot.

20 Claims, 10 Drawing Sheets

311
TABLE: USERS

| User ID * | NAME |
|---|---|
| USER01 | DANIEL |
| USER02 | PATRICK |
| USER03 | LEE |
| USER04 | KAREN |
| USER05 | JOE |

312
TABLE: CONNECTIONS

| CONNECTION ID* | User ID * |
|---|---|
| 1 | USER01 |
| 1 | USER02 |
| 2 | USER01 |
| 2 | USER03 |
| 3 | USER01 |
| 3 | USER04 |
| 4 | USER02 |
| 4 | USER03 |

313
TABLE: IMAGEFILES

| FILE ID* | USER ID | FILENAME |
|---|---|---|
| 1 | USER01 | DSC000123.JPG |
| 2 | USER01 | DSC000343.JPG |
| 3 | USER02 | MYPIC1.JPG |
| 4 | USER02 | MYPIC2.JPG |
| 5 | USER02 | MYPIC3.JPG |
| 6 | USER03 | FIREWORKS 2008.JPG |

314
TABLE: GROUPS

| GROUPID* | GROUPNAME |
|---|---|
| 1 | SKIING ENTHUSIASTS |
| 2 | ROCHESTER NY REGION RESIDENTS |
| 3 | ROCHESTER MECHANICS INSTITUTE ALUMNI |

315
TABLE: GROUPMEMBERS

| GROUPID* | USERID* |
|---|---|
| 1 | USER01 |
| 1 | USER03 |
| 2 | USER01 |
| 2 | USER02 |
| 2 | USER03 |
| 2 | USER05 |
| 3 | USER03 |
| 3 | USER09 |

TABLE: IMAGE METADATA

| FILEID* | METADATANAME* | VALUE |
|---|---|---|
| 1 | DATE PICTURE TAKEN | 7/2/2003 18:56 |
| 1 | EQUIPMENT MAKE | EASTMAN KODAK COMPANY |
| 1 | CAMERA MODEL | KODAK EASYSHARE Z1012 IS DIGITAL CAMERA |
| 1 | GPS LATITUDE | 43.208070 |
| 1 | GPS LONGITUDE | -77.622077 |
| 1 | CAPTION | BEARS AT THE ZOO |
| 2 | DATE PICTURE TAKEN | 9/01/2009 17:21 |
| 2 | EQUIPMENT MAKE | EASTMAN KODAK COMPANY |
| 2 | CAMERA MODEL | KODAK EASYSHARE Z1012 IS DIGITAL CAMERA |
| 2 | GPS LATITUDE | 43.158587 |
| 2 | GPS LONGITUDE | -77.620115 |
| 2 | CAPTION | FLY BALL |
| 3 | DATE PICTURE TAKEN | 2/29/2008 2:01 |
| 3 | EQUIPMENT MAKE | EASTMAN KODAK COMPANY |
| 3 | CAMERA MODEL | KODAK EASYSHARE Z1012 IS DIGITAL CAMERA |
| 3 | GPS LATITUDE | 43.153699 |
| 3 | GPS LONGITUDE | -77.621927 |
| 3 | CAPTION | LATE NIGHT SNACK |
| 4 | DATE PICTURE TAKEN | 6/19/2006 11:57 |
| 4 | EQUIPMENT MAKE | EASTMAN KODAK COMPANY |
| 4 | CAMERA MODEL | KODAK EASYSHARE Z1012 IS DIGITAL CAMERA |
| 4 | GPS LATITUDE | 43.208275 |
| 4 | GPS LONGITUDE | -77.622094 |
| 4 | CAPTION | POLAR BEARS AT THE ZOO |
| 5 | DATE PICTURE TAKEN | 9/8/2009 12:21 |
| 5 | EQUIPMENT MAKE | EASTMAN KODAK COMPANY |
| 5 | CAMERA MODEL | KODAK EASYSHARE Z1012 IS DIGITAL CAMERA |
| 5 | GPS LATITUDE | 43.153472 |
| 5 | GPS LONGITUDE | -77.608150 |
| 5 | CAPTION | EATING BBQ |
| 6 | DATE PICTURE TAKEN | 8/25/2009 18:51 |
| 6 | EQUIPMENT MAKE | EASTMAN KODAK COMPANY |
| 6 | CAMERA MODEL | KODAK EASYSHARE Z1012 IS DIGITAL CAMERA |
| 6 | GPS LATITUDE | 43.157851 |
| 6 | GPS LONGITUDE | -77.619553 |
| 6 | CAPTION | POST-GAME FIREWORKS |

*FIG. 3B*

SYSTEM FOR LOCATING NEARBY PICTURE HOTSPOTS

CROSS REFERENCE TO RELATED APPLICATION

Reference is made to commonly assigned, co-pending U.S. patent applications:
Ser. No. 12/914,266 by Lahcanski et al. filed of even date herewith entitled "Method Of Locating Nearby Picture Hotspots";
Ser. No. 12/914,294 by Lahcanski et al. filed of even date herewith entitled "Organizing Nearby Picture Hotspots";
Ser. No. 12/692,815 by Luo filed on Jan. 25, 2010 entitled "Recommending Places To Visit";
Ser. No. 12/789,525 by Winters filed on May 28, 2010 entitled "Method For Managing Privacy Of Digital Images";
Ser. No. 12/789,533 by Winters filed on May 28, 2010 entitled "System For Managing Privacy Of Digital Images"; and
Ser. No. 12/546,143 by Blose et al., filed on Aug. 24, 2009 entitled "Processing Geo-Location Information Associated With Digital Image Files", the disclosures of which are incorporated herein by reference in their entireties.

FIELD OF THE INVENTION

The present invention relates to mobile digital camera devices and online photograph collection systems.

BACKGROUND OF THE INVENTION

Certain locations exist that are popular amongst travelers and amateur photographers for taking photographs. Such locations are known as "Picture Hotspots". Typical picture hotspots include scenic views along nature trails or key spots in amusement parks. However, travelers may not always be aware when they are near such a hotspot. Often these hotspots may be marked with a physical sign to notify travelers of their location. Alternately, some picture hotspots are identified on maps or in travel guides. However, such information is not always readily available to all travelers or may become outdated. Furthermore, such signs and notifications do not typically provide information about how to best capture a photograph at the hotspot, such as a best angle, best position, or the like.

SUMMARY OF THE INVENTION

It is therefore an object of the present invention to provide notification to a user when they approach a picture hotspot. It is a further object of the present invention to provide proximity and directional information to users for describing nearby picture hotspots. It is a further object of the present invention to provide the user with exemplary photographs previously captured at the hotspot in order to assist the user deciding how to position their camera to capture their own picture. It is a further objective of the present invention to provide a system that supplies hotspot information to a user that is dynamically updated over time so as to be of increased relevance to the user. It is a further objective of the present invention to supply hotspot information to a user that is specifically customized to the user.

This object is achieved by a preferred embodiment of the present invention comprising a network connected computer such as a server comprising a processor for controlling communications over the network with portable communication devices. Under program control the processor manages receiving digital images from the portable communication devices, receiving location data and user data from the communication devices, storing each digital image in a database in association with location data and user data corresponding to one of the communication devices that sent the digital image, storing a location as a hot spot location (on a storage device connected to the processor) if the hot spot location is associated with a plurality of the stored digital images based on the stored location data determining under program control that one of the communication devices is currently transmitting from within a vicinity of a hot spot location based on the location data received from the portable communication device, and for transmitting notification data over the network to the communication device for notifying a user that the user is within the vicinity of the hot spot location. The notification data can include directional information for the user to access on the communication devices for enabling the user to find the hot spot. The database comprises directional information of many kinds such as geographic compass directions to the hot spot, distance information as measured from the communication device to the hot spot, audio data describing the hot spot or how to get to the hot spot for playback on a speaker of the communication device, descriptive text for describing the hot spot or how to get to the hot spot on a display of the communication device, numerical coordinate data and map image data both for display on the display screen. The computer uses the received location data and user data for comparison with other stored images t determine that a location is a popular hot spot. If the user has designated other users as being associated users, then images captured and stored by those other users of a particular hot spot can be sent to the user when he or she is in the vicinity. The computer can be programmed to label a location as a hot spot only if a sufficient number of images of that location are stored in its database. As the number of users and locations grow, that programmed number can be increased.

Another preferred embodiment of the present invention comprises a portable communication device that includes digital storage, a wireless network communication module, a GPS receiver module; and a processor for controlling operation of the device and its components. The processor is programmed to transmit location data and user data over a wireless network via the communication module. The location data is generated by the GPS receiver module and the user data retrieved from the digital storage. The processor receives and stores notification data received from a network connected server over the wireless network in response to the transmitted data. The notification data informs the user that the device is within a vicinity of a hot spot. The notification includes directional information for the user to access on the device for enabling the user to find the hot spot location. The directional information is similar to that described above. The device is capable of generating a visual notification or an audible notification in response to being transported within a certain distance from the hot spot.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

FIG. 3A and FIG. 3B diagram database tables according the present invention populated with records of exemplary data for purpose of illustration of the present invention.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in electronic hardware. Because image manipulation algorithms and systems are well known, the present description will be directed in particular to algorithms and systems forming part of, or cooperating more directly with, the method in accordance with the present to invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

For purpose of this disclosure, a communication device is an electronic device capable of communicating with other electronic devices over an electronic communications network. Such devices may be remote from one and other such that they are not physically located in the same location or rigidly attached to one and other, but are able to communicate with one and other through a network connection.

Figure 1:
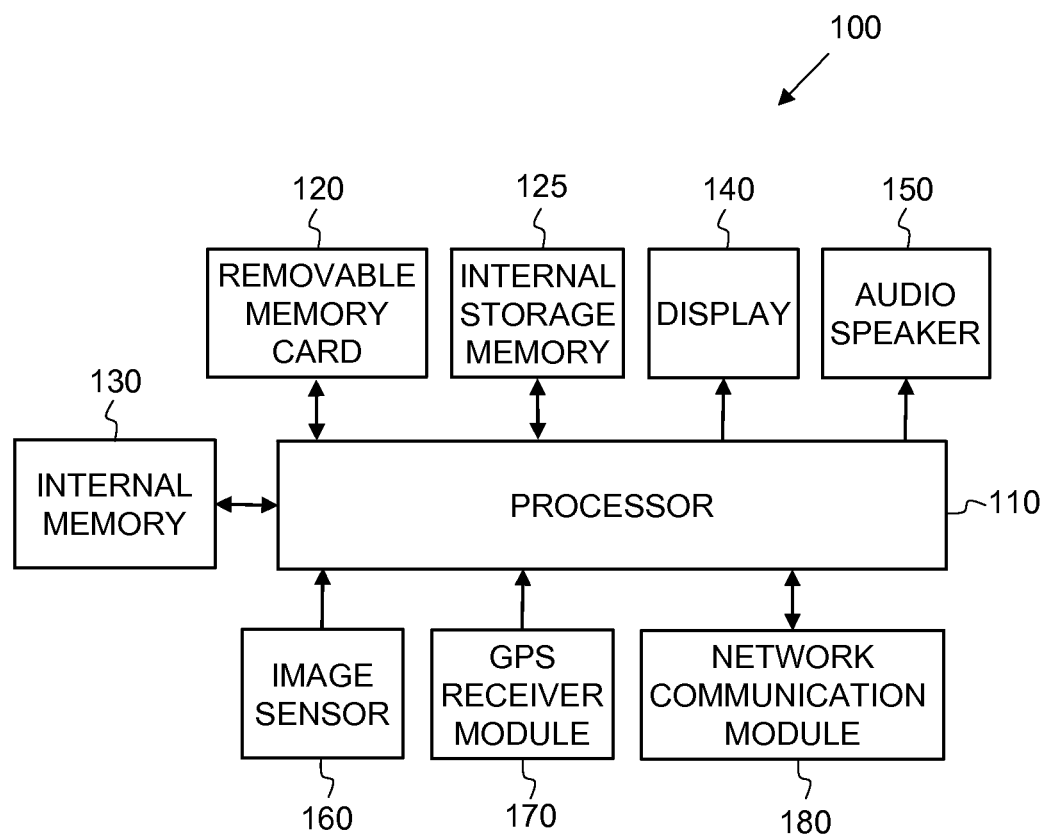
FIG. 1 is a block diagram detailing the internal components of a mobile electronic digital camera for use with the present invention.

Turning now to FIG. 1, a block diagram detailing the internal components of a mobile electronic digital camera 100 for use with the present invention will be described. The digital camera 100 includes a central processor 110. The processor may be constructed using a single application specific integrated circuit (ASIC) or a plurality of ASIC's connected together to execute the processing instructions and functionality of the camera as described herein. The processor 110 executes one or more of the instructions associated with the steps of the method described in more detail below. The digital camera 100 further preferably includes removable memory card 120. The removable memory card 120 is constructed with a non-volatile memory such as flash memory. Removable memory card 120 is in electrical communication with processor 110 and serves to store digital images captured by the digital camera. Digital camera includes internal storage memory 125 which is preferably of a non-volatile memory type such as flash memory, but may be chosen from various types of internal storage memory such as a magnetic hard-drive. Internal storage memory 125 is preferably integral to the digital camera 100 device and not removable by the user. Internal storage memory 125 serves to save setting information including settings related to the user, the camera, a network connection, and the like. Internal storage memory 125 may also serve to store digital images captured by the digital camera, particularly at times when the removable memory card 120 has been removed, is full, or is otherwise unavailable. Digital camera 100 further includes an internal memory 130, preferably constructed of a volatile memory such as Dynamic Random Access Memory (DRAM). Internal memory 130 is in electrical communication with processor 110 and is used by processor 110 for storing data while executing instructions according the methods of the current invention. Digital camera 100 further includes an electronic display 140 for displaying digital images and other information to a user. Electronic display 140 is preferably a Liquid Crystal Display (LCD) type display and is in electrical communication with processor 110. The electronic display is preferably also coupled to a touch screen sensor (not shown) for acquiring user input. Alternately or in combination, other type of input devices such as a joy-stick controller (not shown) may be employed. Digital camera 100 also preferably includes an audio speaker 150 for communicating audio information to the user. Audio speaker 150 is in electrical communication with processor 110. Digital camera 100 further includes image sensor 160 for capturing and digitizing photographic images. Image sensor 160 is preferably of the Complimentary Metal Oxide Semiconductor (CMOS) image sensor type or Charge Couple Device (CCD) type. Image sensor 160 is in electrical communication with processor 110 and transmits the digitized images to the processor. Digital camera 100 further includes Global Positioning System (GPS) receiver module 170 which receives geographic location data from to the global positioning system satellites. GPS receiver module 170 is in electrical communication with processor 110 and transmits the location data to processor 110 for use in executing the instructions of the methods of the present invention. As such, the UPS module of this embodiment can be any type of location receiver module that detects a location based on a signal transmitted from the GPS Satellite system. Alternate types of location receiver modules adapted to receive location signals from other sources may also be used with the present invention. Digital camera 100 preferably further includes network communication module 180 for communicating with an electronic communication network such as a WiFi network or a cellular network. Network communication module 180 is in electrical communication with processor 110 and sends and receives information to the processor for executing instructions according to the methods of the present invention. Processor 110, removable memory card 120, internal memory 130, display 140, audio speaker 150, image sensor 160, GPS receiver module 170, and network communication module 180 are components currently available and one skilled in the art may select and configure such components to successfully practice the present invention.

Figure 2:
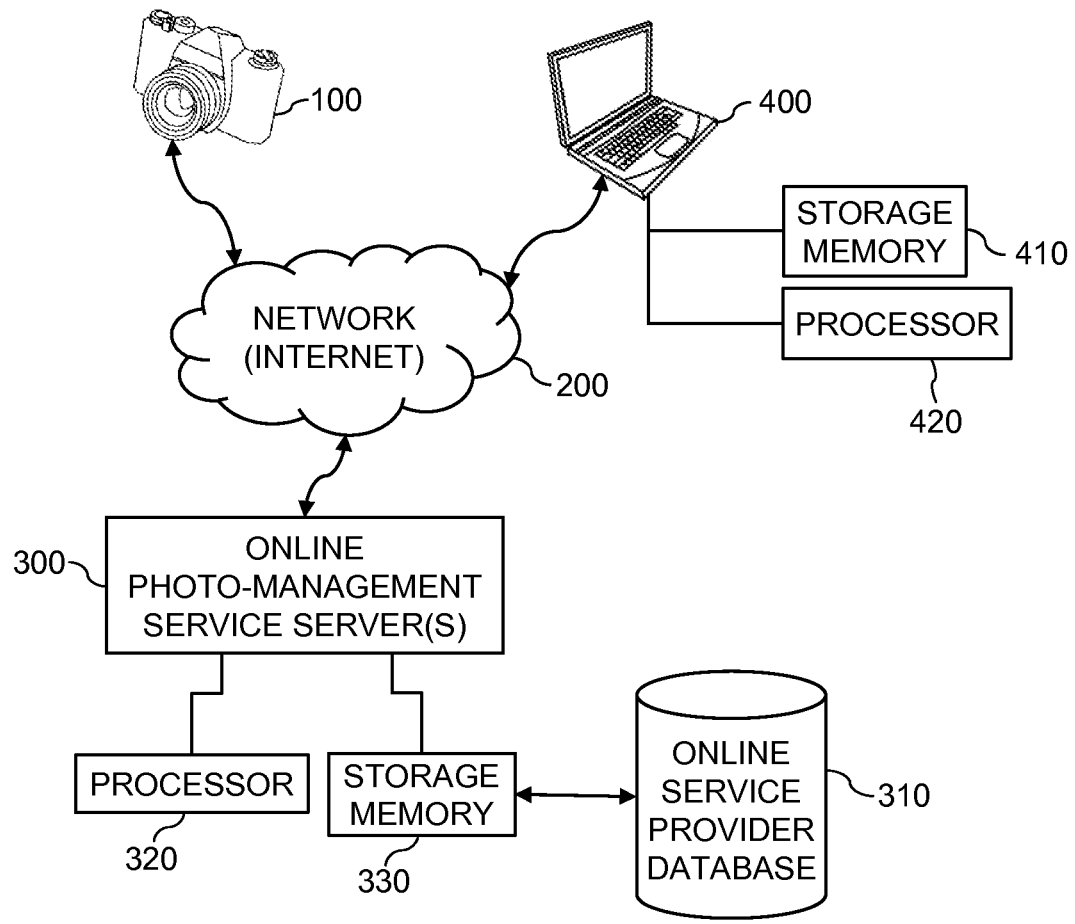
FIG. 2 is an illustration of a communications system according to multiple embodiments of the present invention.

Turning now to FIG. 2, the figure illustrates a communications system according to multiple embodiments of the present invention. Digital camera 100 is in communication with network 200 using the network communication module described above. As such, digital camera 100 is a type of communication device. Network 200 is preferably a public network such as the internet, but can also be a private network or a cellular communications network or the like. Communication to the network may be achieved through the use of a network service provider (not shown). Online photo-management service 300 is also in communication with the network 200. Online photo-management service 300 includes one or more servers having processor(s) 320 (central processing units) and at least one storage memory 330, such as a magnetic hard disk, for executing server programs and functions, for receiving and transmitting network communications, for storing digital images files, metadata, other user information, as well as any HTML and PHP files needed to access the service. Online photo-management service 300 includes a database 310 for managing a plurality of users and associated digital image files. Digital camera 100 can transmit digital images from a remote location to the online photo-management service 300 by way of network 200. One or more computer access devices, such as computer access device 400, may also access the online photo-management service 300 by way of network 200 in order to access digital images stored there. The computer access device can be a desktop, mobile, handheld, or other type of computer device. The computer access device also includes a processor 420, or central processing unit (CPU), and preferably includes its own storage memory 410, such as a hard drive. The computer access device 400 also includes a digital electronic display device which can be of the Liquid Crystal Display (LCD) type or the like for the displaying of digital images and graphic user interfaces. The computer access device also includes a network interface unit (not shown) such as a network interface card or wireless network adaptor for connecting to network 200. As such, the computer access devices are a type of communication device which can be remotely located from the digital camera 100 as well as the online photo-management service 300, but in communication by way of the network 200.

Database 310 preferably includes a plurality of tables for managing users and digital images files. Tables of Database 310 are shown in FIGS. 3A and 3B. These tables are each populated with several records of exemplary data for purpose of illustration of the present invention, however, it will be understood that example includes additional data not shown and that actual data can differ from the data show here. The names of the fields of each table are marked with an underline and primary key field(s) are marked with an asterisk "*" symbol. Table 311, titled "Users" is used for recording user information including a "user ID" for uniquely identify a user. User ID may optionally be a screen name for the user accord. User ID may alternately be a purely numerical auto-incremented counter. Additional information such as a user name is included, such as the "Name" field shown. Additional fields (not shown) such as first name, last name, password, and the like can alternately be included as desired. Additional data about user configuration preferences can be stored included as additional fields (not shown) of Table 311 or in another related tabled. Table 312 titled "Connections" is used for recording connections between users. Such connections can be used to identify friends, family, associates, and the like. Table 313 titled "ImageFiles" is used for identify digital image files which have been associated with a user. Each file is assigned a "FileID" for tracking. The "FileName" may be used for tracking the storage of the file on the storage memory 330. The "UserID" field identifies the associated user. For example, "DSC000123.jpg" may have been uploaded to the online photo-management service by "User01". The associated user is considered the "owner user" of the associated file. While still image files of the JPEG (".JPG") type are shown, other types of image files, including video image files, such as ".AVI", ".MOV", and the like, can also be applied to the present invention. Table 314 titled "Groups" is used for recording groups to which users may elect to associate. The groups are provided with an assigned "GroupID" or a "GroupName" or both to identify the groups. Additional fields such as a description may optionally be included here. Table 315 entitled "GroupMembers" defines the association of users to each group.

Figure 4A:
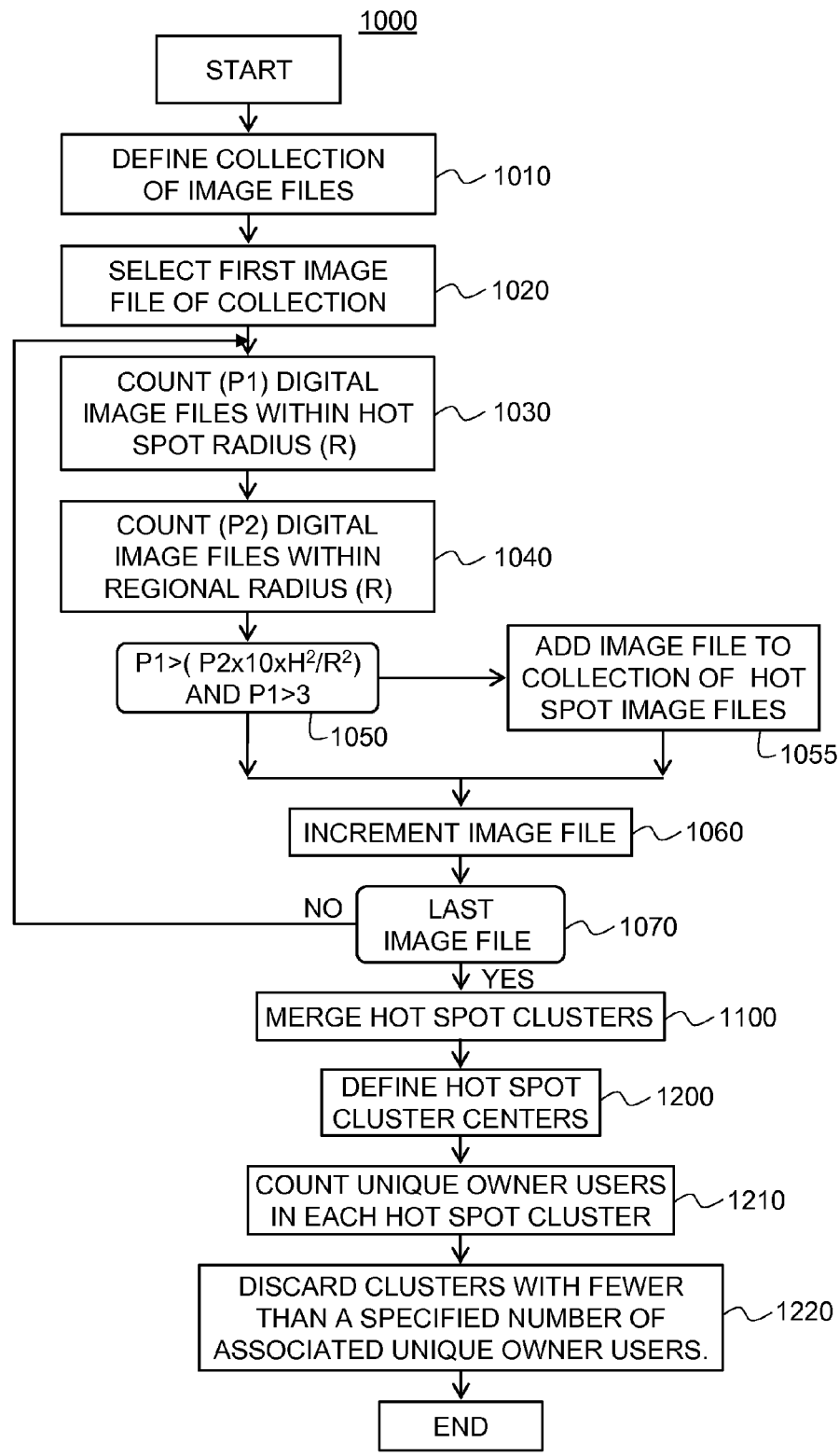
FIG. 4A is a flow chart illustrating a process for determining picture hotspots.

Table 316 shown in FIG. 3B tiled ImageMetadata stores metadata associated with the digital image files. The image FileID, as used in Table 313, is used to associate the image file. A field titled "MetaDataName" identifies the type of metadata. Many types of metadata can be stored in the table, including geographic location metadata representative of a capture location such as "GPS Latitude" and "GPS Longitude" data. A field titled "Value" stores the data value for each metadata item. Other types of location metadata can also be employed and stored in the database table. For example, street address data can also be used. Nearby street addresses can be obtained by converting the GPS location data using a database of locations of street addresses. According to the present invention, picture hotspots are determined using the data stored in database 310. A process for determining picture hotspots will now be described with reference to process 1000 shown in FIG. 4A and with continued reference to the parts and figures previously described. Process 1000 can be executed by processor 320 of the photo-management service 300 and can be constructed using an object oriented programming language by one skilled in the art. Picture hotspots are determined by analyzing image clusters using the stored geographic location metadata. Process 1000 can be executed periodically, for example once per day, once per hour, once per week, or at another desired frequency. Alternately, process 1000 can be performed whenever a new image is uploaded to the online photo-management service. Alternately, process 1000 can be performed upon request by a requesting user over network 200.

Process 1000 begins with step 1010 where a collection of image files is defined by querying the database and the resulting collection of references to image file are stored temporarily in memory. In one embodiment of the present invention, global picture hotspots are determined by defining the collection as all image files stored in table 313. The resulting image files are further refined by selecting only image files having geographic metadata as stored in table 316. The resulting records are used as the collection in step 1010. In an alternate embodiment, older pictures can be disregarded by establishing a prior date range and filtering on either capture date metadata or upload date metadata (not shown) greater than a certain date when defining the collection of image files in step 1010. This provides an advantage in avoiding generating hotspot locations which were temporary or no longer present.

In yet another, more preferred, alternate embodiment of the present invention, the user specific customized picture hotspots are generated by querying table 313 during step 1010 for all users connected to specific user as defined by table 312 and returning image files associated with that user. For example, if user specific picture hotspots are to be determined for "user01", it is first determined that "user02", "user03", and "user04" are connected to "user01" by querying table 312. Then table 313 is queried for all image files associated with "user02", "user03", or "user04" in the field "UserID". The resulting image files are further refined by selecting only image files having geographic metadata as stored in table 316. The resulting records are used as the collection in step 1010.

In yet another alternate embodiment, user interest group specific picture hotspots are determined by querying table 313 for all users associated with the same groups as a specific user as defined in table 315. For example, if a user interest group specific picture hotspot is to be determined for "user01", it is first determined that "user01" is associated with groups "1" and "2" and that "user03", "user02", and "user05" also belong to these groups by querying table 315. Then table 313 is queried for all image files associated with "user03", "user02", or "user05" in the field "UserID". The resulting image files are further refined by selecting only image files having geographic metadata as stored in table 316. The resulting records are used as the collection in step 1010.

Combinations of these alternate embodiments can also be obtained by combing these queries of dates and associates into a further refined collection. For example, querying both table 312 and 315 for all users either connected to a specific user or in a common group with the specific user and then querying table 313 for of the resulting users. For example to determine a picture hotspot for "user01", table 313 would be queried for all image files associated with "user02", "user03", "user04", or "user05" in the field "UserID". This will yield a broader range of hotspots of potential interest to the user. Which of these alternate embodiments, or combinations thereof, is used can be fixed by the system, or selected as a preference for each user. Alternately, each user may specifically select by preference which user connections in table 312 and/or which groups in table 315 the user wishes to use for the purpose of defining hotspots. Such user preferences can further be stored in the tables of database 310.

With a collection of image files defined in step 1010, process 1000 then proceeds to step 1020 where the first of the image files is selected. Step 1020 begins a process loop by which each image file will be examined in turn to determine if the image file is part of a picture hotspot.

Next, step 1030 is executed where a count (P1) of image files is calculated within a "hotspot radius" (H) distance centered on the selected image file. Hotspot radius defines a relatively small region locally around the selected image file. Count P1 is calculated by executing another process loop (not shown) where the distance of each image file in the collection to the selected image file calculated, adding to P2 if within distance H. Hotspot radius H can be preset by the system of the photo-management service 300 or be set by preference of a specific user. For example, H can be set to a distance of 20 m, 40 m, or to another desired distance.

For purposes of determining distance between two geographical locations, the Haversine formula (see Equation 1 below) for calculating a great circle distance can be used. This simplified formula ignores altitude or depth, which are also not recorded as metadata in preferred embodiments thereby reducing the amount of data which needs to be stored. Therefore, a constant altitude, such as an approximate sea level is assumed. In this case the average radius of the Earth of approximately 6367.5 km can be used. This can result in small inaccuracies when calculating distance, however, such inaccuracies are small enough to be neglected by the users for purposes of the present invention. The simplified equation also assumes that the Earth is perfectly spherical, ignoring the fact that the Earth's radius is slightly larger at the equator than at the poles. This assumption simplifies the processing thereby improving speed of the processing and reduced storage space for the processing instructions. Other known formulas for calculating distance can be employed by one skilled in the art, including the spherical law of cosines. Alternately, more complex embodiments of the present invention can be implemented by one skilled in the art by recording altitude and accounting for altitude in the distance equation and/or by using non-spherical Earth models.

$$d = 2 \times R \times \arcsin\left(\min\left(1, \sqrt{\sin^2\left(\frac{lat_2 - lat_1}{2}\right) + \cos(lat_1) \times \cos(lat_2) \times \sin^2\left(\frac{lon_1 - lon_1}{2}\right)}\right)\right) \quad \text{Equation 1}$$

In Equation 1, lat1 and lon1 are the latitude and longitude and longitude respectively of the first location for comparison, lat2 and lon2 are the latitude and longitude respectively of the second location for comparison, and R is the radius of the Earth or 6367.5 km. Longitude and Latitude are preferably converted from degrees to radians. The minimum ("min") function assures that the arcsine function is not provided with a value greater than 1.

Next, step 1040 is executed where a count (P2) of image files is calculated within a "regional radius" (R) distance centered on the selected image file. The regional radius defines a relatively larger region compared to the local region previously discussed in step 1030. Count P2 is calculated by executing another process loop (not shown) where the distance of each image file in the collection to the selected image file calculated, adding to P2 if within distance R. Alternately, P2 can be tallied while also counting P1. Regional radius R can be preset by the system of the photo-management service 300 or be set by preference of a specific user. For example, R can be set to a distance of 500 m, 1000 m, or to another desired distance.

Next, decision block 1050 is executed where the count (P1) of image files within the hotspot radius is compared to the count (P2) of image files in the region to determine if the count of image files. A formula useful for the comparison is shown here in equation 2.

$$\text{If } P1 > \left(P_2 \times 10 \times \frac{H^2}{R^2}\right) \text{ and } P1 \geq 3 \quad \text{Equation 2}$$

In equation 2, if local count P1 is greater than a percentage of regional count P2 defined as 10× the ratio of the square of hotspot radius H to regional radius R and also greater than or equal to a minimum count of 3, then the image file as being part of a picture hotspot. Effectively, a hotspot is identified here if density of image files in the local area is 10 times greater than the density of image files in the larger regional area and also at least a minimum of 3 image files. Optionally, the values of 10 and 3 can be chosen to be different values if so desired. Image files which are found to be part of a picture hotspot are recorded in step 1055 in a temporary memory as being associating with a second collection of hotspot image files which is a subset of the first collection established in step 1110.

Figure 4B:
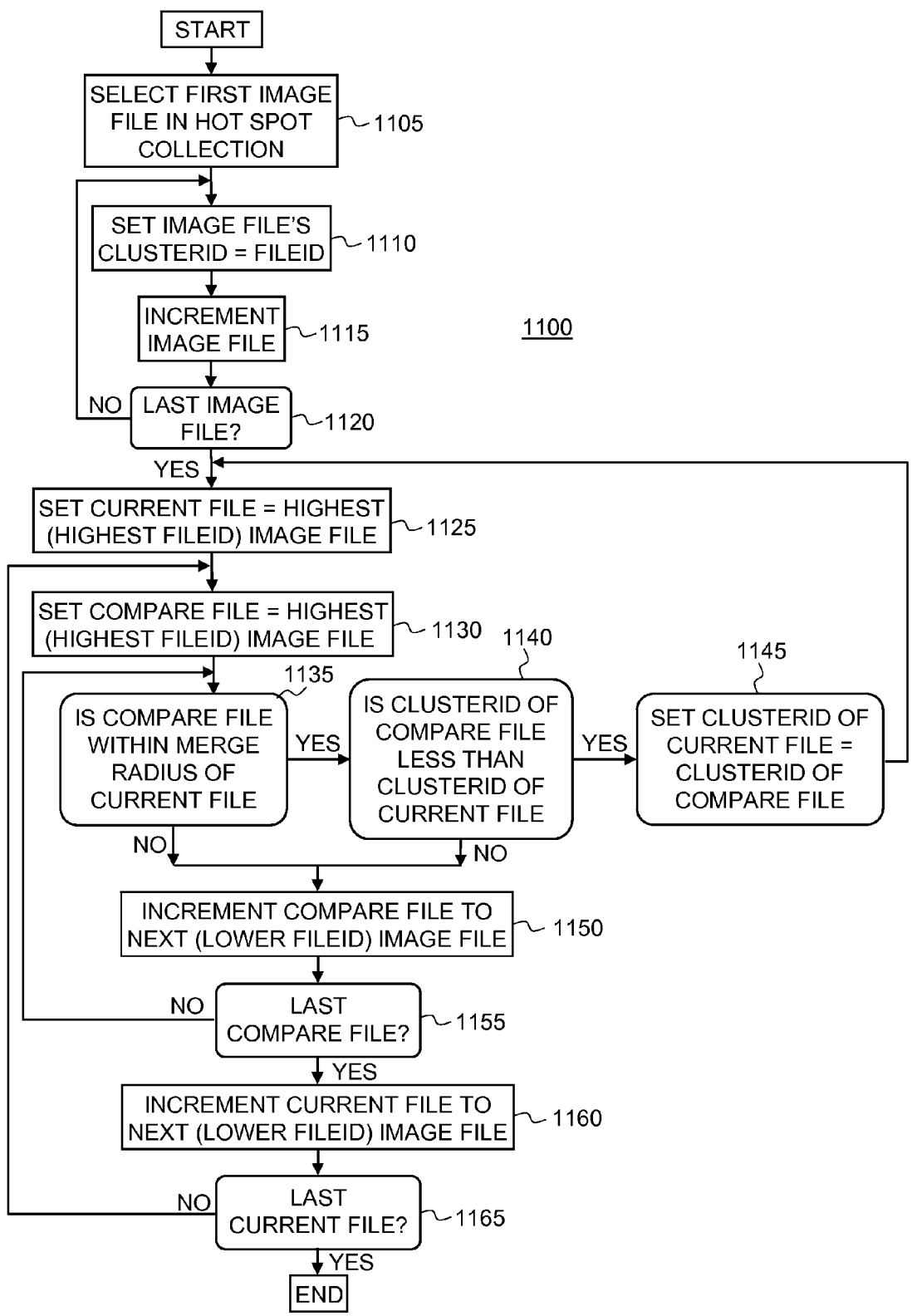
FIG. 4B is a flow chart illustrating a process for merging hotspots into clusters shown in further detail.

The next image file is incremented in step 1060 and the process loops back to step 1030 until last image file has been examined per decision block 1070. Process 1000 then proceeds with process 1100 where the images previously identified as belonging to a hotspot are merged into clusters. The steps of process 1100 are described in more detail in FIG. 4B.

Process 1100 begins with step 1105 by incrementing through the image files in the second collection of hotspot image files beginning with the first image file in order of the FileID. In step 1110, a ClusterID for the hotspot cluster is established and set equal to the image file's FileID and thereby the hotspot is associated with that image file. The image files are incremented to the next image file at step 1115 in order of FileID and the process loops to step 1110 until the last image file has been processed at decision block 1120.

Process 1100 then executes another series of process loops by selecting the image file with the highest fileID in the hotspot image file collection in step 1125. The selected image file in this loop is referenced as the "Current file". In step 1130 a further embedded process loop is executed by again selecting the image file with the highest fileID in the hotspot image file collection which becomes referenced as the "compare file".

The distance between the current file and the compare file is checked in decision block 1135. If this distance is with the hotspot radius (H), then decision block 1140 is executed. In decision block 1140 the clusterID associated with the compare file is compared to the clusterID associated with the current file. If the clusterID of the compare file is found to be lower than the clusterID of the current file, process 1100 proceeds to step 1145.

In process 1145, the clusterID associated with the current-file is then set to the lower clusterID of the comparefile, overwriting the previous association. In this way, image files associated with a hotspot are clustered into groups having the same clusterID. By incrementing the image files of the process from highest to lowest and by associating each image file with the lowest clusterID, a reduced set of clusters are formed at the lowest clusterID values for each hotspot. Having adjusted a clusterID of one of the image files in the hotspot image file collection, the process then iterates by looping back to step 1125, thereby restarting the comparison with the image file at the highest fileID.

If, on the other hand, either decision block 1135 or decision block 1140 return a false result, process 1100 proceeds to step 1150 where the compare file is incremented to the next compare file having the next lower fileID. Decision block 1155 causes the process to loop back to decision block 1135 until the last compare file is compared. The current file is then incremented at step 1160 to the next image file in the hotspot image file collection having the next lowest fileID value. Decision block 1165 loops back to step 1130 until all current files have been compared.

Process 1100 completes having established and stored in memory a set of one or more clustersIDs for clusters of image files belonging to picture hotspots. Each clusterID is hereafter considered as representing a unique picture hotspot with digital image files associated with each picture hotspot by the clusterID value. Returning now to FIG. 4A, process 1000 then proceeds to step 1200. In step 1200, a center point is calculated for each hotspot cluster previously established. Giving the relatively small area of a hotspot cluster, this calculation can be done by a simple averaging of the geographic coordinates of all image files in the hotspot cluster. However adjustments to the coordinates must be made in the rare instance when the hotspot cluster lies over the 180 degree meridian or a pole by temporarily adjusting the coordinates to a shifted 360 degree reference system. During step 1200, the defined center point is stored either a temporary volatile memory or alternately in nonvolatile memory as part of the database for later use. The center point location data is preferably in the form of a longitude and latitude coordinate, but can also take the form of a street address or other type of location data. The image files associated with each cluster are thereby located proximate to the center point of the cluster.

Process 1000 continues with step 1210, where the number of different or unique owner users associated with the digital image files making up each hotspot cluster are counted. This counting can be achieved using a SELECT type query with a GROUP BY "UserID" function. This count for each hotspot cluster is stored in memory. This count data is useful when a user requests picture hotspot locations, as the hotspot clusters can then be filtered for clusters having images from two or more users, three or more users, or another number of users as defined by either a user or system preference. Alternately, all clusters may be returned which would include clusters which have images only from a single user, for example three images taken nearby from the same user. In a preferred configuration, hotspot clusters are limited to clusters consisting of three or more digital image files associated with three or more different users. Hotspot clusters having fewer associated different owner users than then the specified criteria are discarded at step 1220.

Hotspots which have been determined by process 1000 are then available upon request from a user with a mobile digital camera as will be described in further detail below. By executing process 1000, hot spot information is dynamically updated over time by using the location metadata of image files continually received by the online photo-management service and stored the database. As more pictures are received, new hot spot locations will be determined. This is done without the need for a manual operator inputting the hotspot locations. Additionally, the hotspot locations can be made particularly relevant (or customized) to the user by filtering on the users associations as described above.

Process 1000 has been described as executing a particular clustering technique, however, variations and alternate clustering techniques may also be applied by those skilled in the art.

Figure 5:
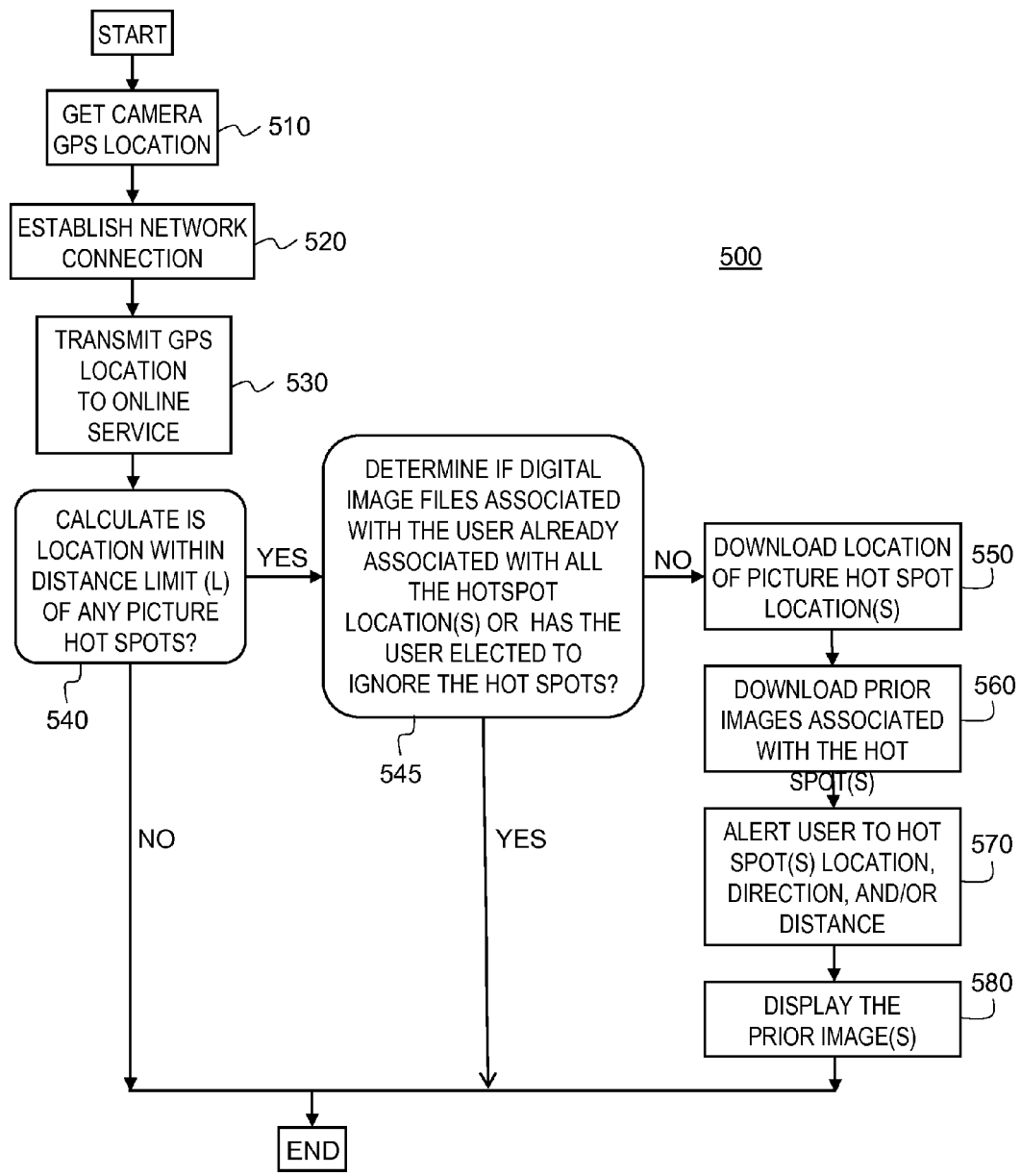
FIG. 5 is a flow chart illustrating a process for notifying users of a digital camera of picture hot spot locations according to an embodiment of the present invention.

Turning now to FIG. 5 with continued reference to the previously described figures, process 500 for notifying users of a digital camera device of picture hotspot locations according to a first embodiment of the present invention will now be described. Process 500 with step 510 where the location of the camera is retrieved by the digital camera device 100. The location is preferably received from the GPS receiver module 170. Alternate types of signals other than GPS can also be employed to retrieve the camera location. In step 520, a network connection to network 200 is established using network communication module 180. The connection can be through, for example, a wireless LAN or WAN or a cellular communications network. The network connection provides a communication route between the camera 100 and the online photo-management service 300. Login information designating the user (also referred to as designation information) to online photo-management service 300, such as a user name and a password identifying the user, can either be requested during step 520 or be previously stored in the digital camera 100 internal storage memory 125 to facilitate access. The login information is transmitted over the network to the online photo-management service for authentication. Step 520 can alternately be performed prior to step 510. In step 530, location data corresponding the location received from the GPS receiver module in step 510 is transmitted over the network 200 to on-line photo-management service 300.

Next decision block 540 is performed. In decision block 540, the received location data is compared to the location, or centers) of known picture hotspots, which are determined as previously described above. The comparison is executed at on-line photo management service 300 using processor 320.

Comparison of the received camera location to the hotspot location is performed with respect to a distance limit (L). The distance limit may stored either in the online photo-management service 300 or the digital camera 100. The distance limit can alternately be user-selectable so that the user can choose a preferred distance. Alternately, it can be varied based on location, for example where some regions such as known urban regions have a lower limit while other regions such as known wilderness regions have a higher limit. If the received camera location is not within the distance limit of any calculated picture hotspots, then process 500 ends. If, on the other hand, the received camera location is within the distance limit of at least one picture hotspot, process 500 proceeds to decision block 545.

In decision block 545, it is determined if the camera user already has digital image files associated with all of the nearby hotspot locations or if the user has previously elected to ignore the picture hotspots. Decision block 545 prevents alerting the user of picture hotspots of which the user is already familiar. Prior images associated the user and with the picture hotspot are determined by querying database 310 of the on-line photo management service 300. Elections to ignore picture hotspots by the user, as will be described in further detail below, can be either stored at the on-line photo management service 300 or in the internal storage memory 125 of digital camera 100 for querying during decision block 545. If at least one of the nearby hotspot locations does not have an image file associated with the camera user and has not been indicated as one which the user wishes to ignore, process 500 proceeds to step 550. Otherwise, process 500 ends. In an alternate simplified embodiment of the present invention, decision block 545 can be omitted. In this alternate embodiment, the user will always be alerted of nearby hotspots. Alternately, on-line photo-management service 300 can provide a preference for each user, enabling the user to decide whether or not to be notified of previously acknowledged picture hotspots and whether or not to execute decision block 545. In yet further alternate embodiments of the present invention, decision block 545 can be reduced to query for only one of either previously captured digital image files associated with the user and the picture hotspot or picture hotspots which the user has elected to ignore.

In step 550, the locations of nearby picture hotspots within distance limit L are transmitted over the network from the on-line photo management service 300 to the digital camera 100 and stored in internal memory 130. The location is preferably transmitted as latitude and longitude coordinate data, however alternately, other types of location data such as a street address can be transmitted in addition to or instead of the coordinate data. Next, step 560 is executed where one or more of the prior digital image files associated with each of the nearby picture hotspots are also transmitted over the network from the on-line photo management service 300 to the digital camera 100 and stored in internal memory 130. Lower resolution or thumbnail versions of the digital image files can be utilized in order to reduce required storage space and transmission time.

Next, step 570 is executed whereby the user is alerted to presence of nearby picture hotspots. The alert can be a visual alert, for example a message or a map displayed on display 140. The alert can also be an audio alert, such as a synthesized voice message, a series of beeps, or the like. The alert can be a combination of audio and visual responses. The alert preferably communicates the location, direction, or distance of the picture hotspots. For example, the alert can be a message such as "A picture hotspot is located 20 meters to the northwest of your current location". Alternately, the alert can show a scaled map with icons indicating the current camera location and the hotspot location. The location of multiple nearby hotspots can be communicated with multiple simultaneous or sequential alerts.

In step 580, the transferred image files from step 560 are displayed on the display 140. The displaying of step 580 can be executed automatically, following or concurrent to the alert of step 570. Alternately, step 580 can be executed at the request of the user. For example, the user can be provided with an icon or button which when activated causes the display of the digital image files. The digital image files provide the benefit to the user of being able to see what types of images where previously captured at this location to assist the user in deciding how to capture his or her own digital image. For example, the user may determine which position or angle is best suited for capturing a digital image. Following step 580, process 500 ends.

During step 570 or 580, the user can cancel the notification (step not shown), ending process 500. Optionally, the user can be provided with the option (not shown) to "ignore" a picture hotspot, for example by providing an "ignore" button on the graphical user interface of display 140. The location of ignored picture hotspots can stored locally in internal storage memory 125 of digital camera 100. Alternately, ignored picture hotspot locations for each user can be transmitted via network 200 to online photo-management service 300 for storage in database 310 in an additional table (not shown) having fields for userID and location (longitude and latitude). Since, according to the present invention, picture location hotspots can change or move over time as more digital image files are uploaded to the online photo-management service by users, the identification, such as clusterID, of the ignored picture hotspot is not used. Instead, at the time process 500 is next executed, the ignored picture hotspot locations are considered to be the same as a found nearby picture hotspot in decision block 545 if it is within a radius, such as hotspot radius (H), of the picture hot.

Process 500 can be repeated periodically, for example every 10 minutes, or at the manual request of the camera user or automatically when the digital camera is activated or powered on.

Figure 6:
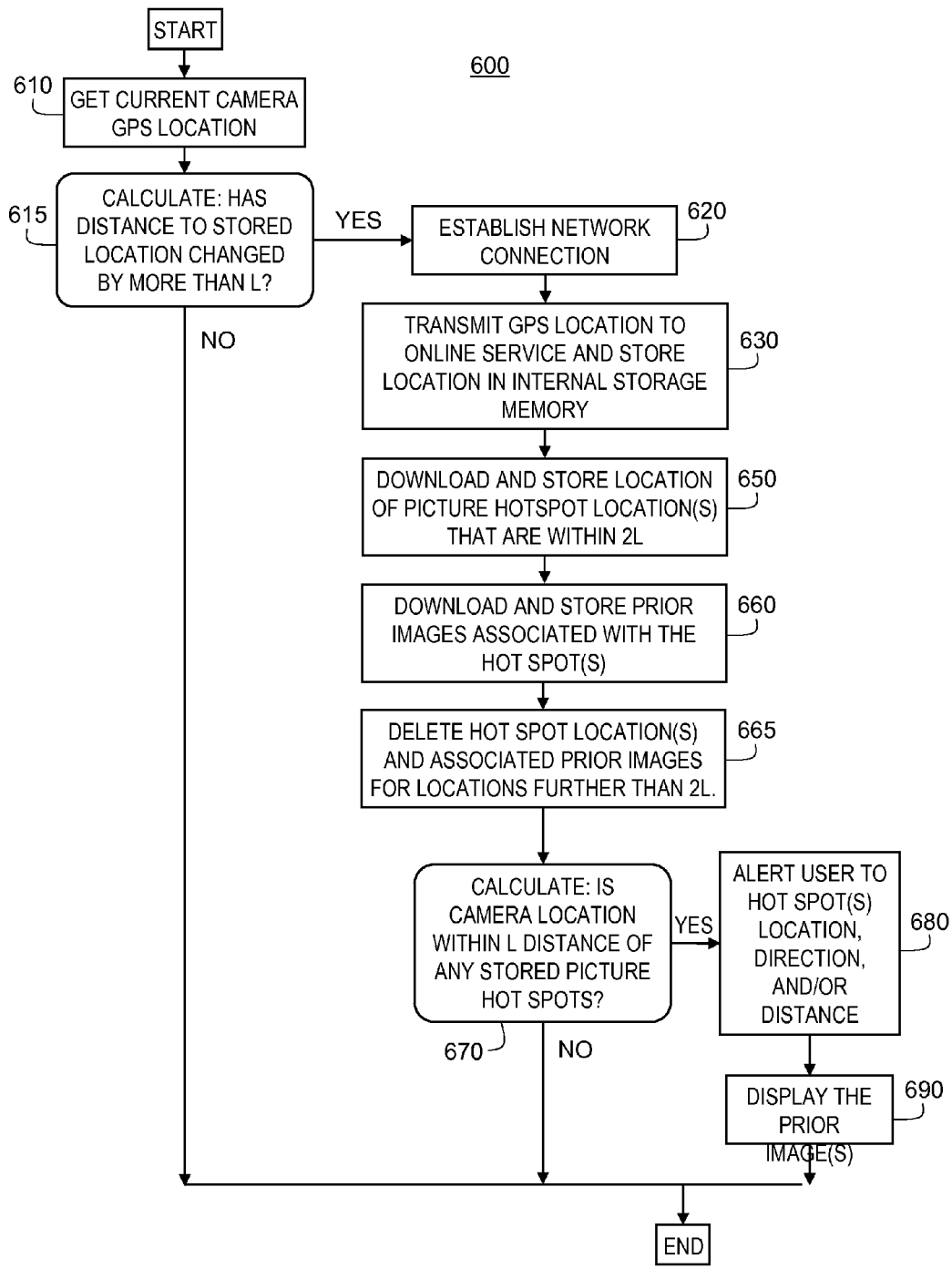
FIG. 6 is a flow chart illustrating a process for checking for updating nearby hotspot location in response to changes in a device's location.

Turning now to FIG. 6, process 600 according to an alternate embodiment of the present invention will now be described whereby the digital camera 100 checks for changes in its location while searching for picture hotspot locations. Process 600 begins with step 610 where the current location of the camera is retrieved by the digital camera device 100. The location is preferably received from the GPS receiver module 170. Alternate types of signals other GPS can also be employed to retrieve the camera location.

Next, decision block 615 is executed. In decision block 615 the current camera location data is compared to a stored camera location from the last time the camera communicated with on-line photo-management service. More description about this stored location is provided below with respect to step 630. If the difference in these two locations is less than distance limit (L), process 600 end. As previously described, the distance limit (L) is preferably pre-set to a fixed distance and can be pre-stored, user selectable or varied by location. Useful values for a distance limit could include, for example, 100 m, 250 m, 500 m, 1 km, or a similar distance. However, if the current location of the camera compared to the stored location has changed by more than L, the process continues to step 620. Also, if no stored location is available, such as the first time process 600 executes, decision block 615 will also proceed to step 620.

In step 620, a network connection to network 200 is established using network communication module 180. The connection can be through, for example, a wireless LAN or WAN or a cellular communications network. The network connection provides a communication route between the camera 100 and the online photo-management service 300. Login information to online photo-management service 300, such as a user name and password, can either be requested during step 620 or be previously stored in the digital camera 100 internal storage memory 125 to facilitate access. The login information is transmitted over the network to the online photo-management service for authentication. Next, in step 630, location data corresponding to the current location received from the GPS receiver module in step 610 is transmitted over the network 200 to on-line photo-management service 300. During step 630, the transmitted current location is also stored in internal memory 130 for use in subsequent executions of process 600 at step 615.

Next step 650 is executed where camera 100 requests the location information for all picture hotspots within a radius of two times the distance limit (or 2 L). The requested hotspot locations can be limited by certain user preferences as previously described. For example, the request can be for hotspots containing three or more digital image files from three or more different users. This location information is transmitted from the on-line photo-management service 300 across network 200 to camera 100 and stored in internal memory 130. Alternate distances such as three or four times the distance limit can also be used if sufficient storage memory space exists in camera 100. Next, in step 660 one or more of the prior digital image files associated with each of the transmitted picture hotspots are also transmitted over the network from the on-line photo management service 300 to the digital camera 100 and stored in internal memory 130. Lower resolution or thumbnail versions of the digital image files can be utilized in order to reduce required storage space and transmission time. Furthermore, if any image files associated with these picture hotspot locations are already stored in memory, for example from a previous execution of process 600, these image files do not need to be re-transmitted. Next step 665 is executed whereby any picture hotspots outside of the 2 L range and associated image files currently stored in internal memory 130 are deleted in order to free memory space for other uses.

Next, decision block 670 is executed using processor 110 of digital camera 100 to compare the distance current location to the location of the received hotspots. If no hotspot is within the distance limit (L), process 600 ends. Otherwise process 600 proceeds to execute step 680.

In step 680, the user is alerted to the presence of any picture hotspot locations within the detection limit (L), including for example, location, direction, or distance. The alert can be visual, audio, or a combination thereof such as previously described above. In step 690, the transferred image files are displayed on display 140 for reference by the user. Alternately, step 690 can be executed by request of the user.

Execution of process 600 can be repeated periodically, for example every 10 minutes, or at the manual request of the camera user. Process 600 can also be set to be executed when the digital camera 100 is first powered on or otherwise initially activated.

Figure 7A:
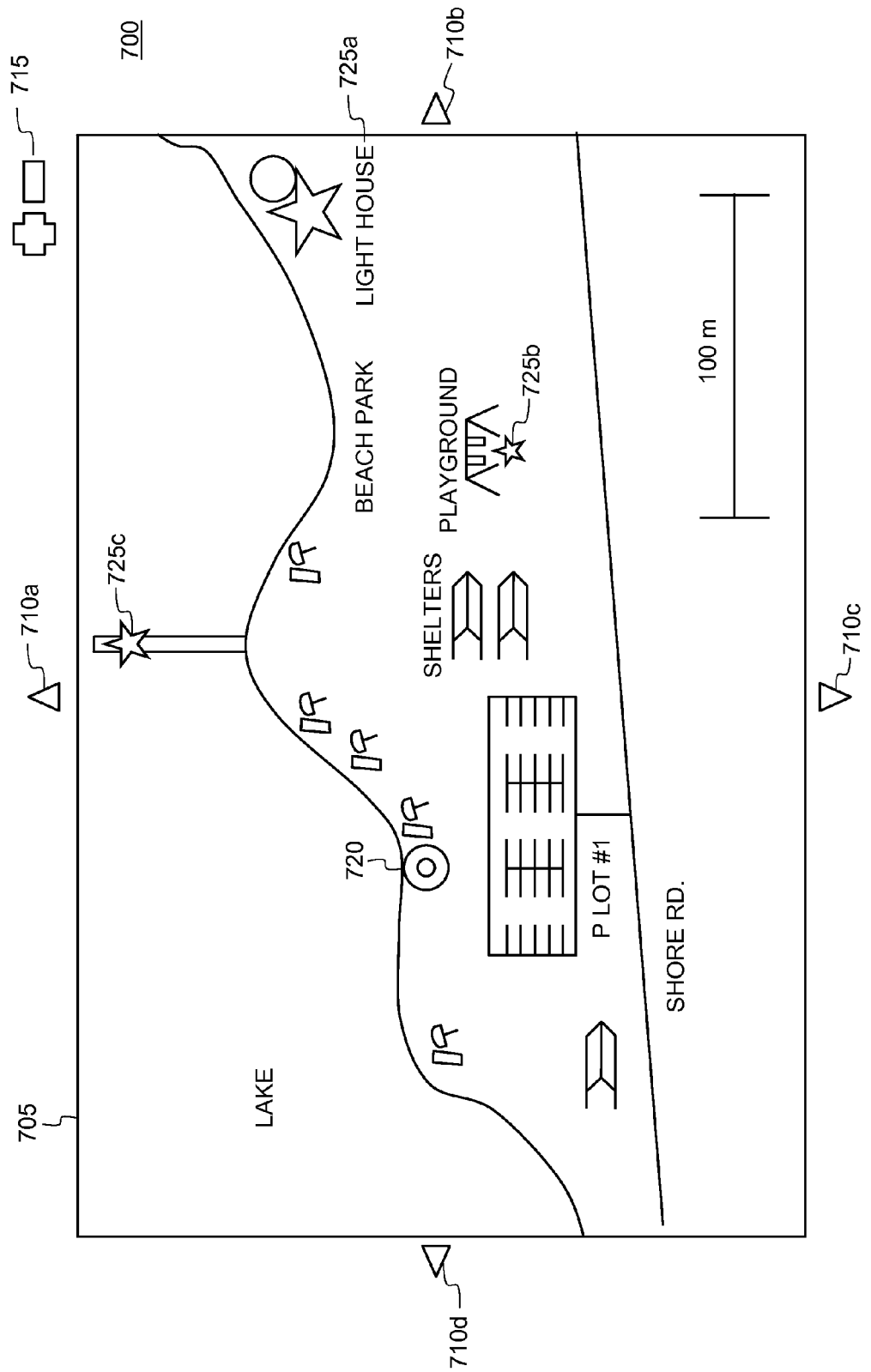
FIG. 7A and FIG. 7B are illustrations of a Graphical User Interface layouts according to an aspect of the present invention.
Figure 7B:
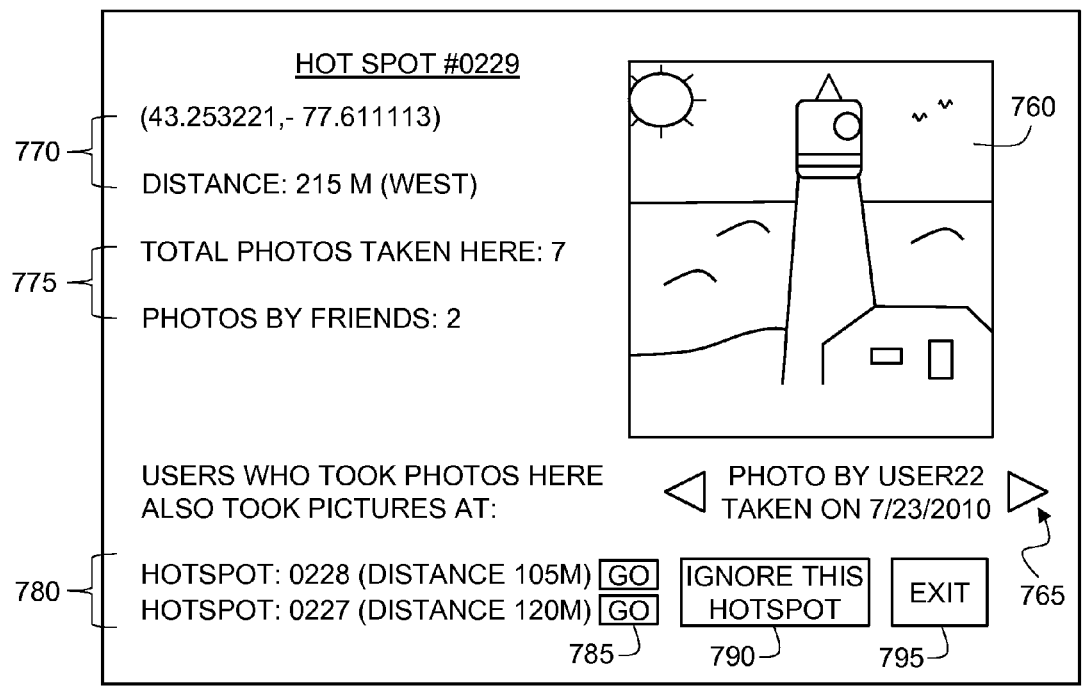

Turning now to FIGS. 7A and 7B a graphical user interface (GUI) for display on display 140 of camera 100 in conjunction with the present invention will be described. Starting with FIG. 7A, GUI screen 700 is shown. GUI screen 700 includes a map region 705 with scrolling navigation buttons 710a, 710b, 710c, and 710d and zoom navigation buttons 715. The map region 705 can be used to display various types of maps such as satellite views, street maps, topographical maps, or combinations thereof. The navigation buttons allow the user to view difference portions and perspectives of the maps on the limited display area. Location icon 720 shows the current location of the user as received from GPS receiver module 170. As previously described above, nearby hotspot locations have been determined and are presented here for the user. These hotspots are indicated as by hotspot icons 725a, 725b and 725c which are shown here, for example, as star shaped icons.

In this embodiment, the size of the various hotspot icons are varied by an importance metric. For example, hotspot icon 725a is larger than hotspot icon 725c which is larger than hotspot icon 725b. Alternately, importance can be indicated by varying the shape, type, or color of the icons. Importance can be determined using a number of metrics. One exemplary method ranks importance by the number of digital images taken at the hotspot weighted by the number of these digital images which are associated with users directly connected to the user of the camera. For example, the importance rank score is calculated as the number of digital images at the hotspot plus 4 times the number of digital images associated with users connected to the user of the digital camera as defined in table 312 of database 310. Counts of digital images at the hotspot and their associated users are received by submitting and SQL query to database 310 of the online photo-management service 300.

The hotspot icons are user selectable, for example by touching a touch screen interface. Selecting one of the hotspot icons retrieves additional information about the hotspot as shown in FIG. 7B. In FIG. 7B, GUI screen 750 is displayed. GUI Screen 750 includes a digital image region 760 for displaying exemplary digital image files transmitted from online photo-management service 300. Additional information is shown in information region 765 including the associated user and the date of capture of the digital image. Navigation buttons are provided to allow the user to scroll through a plurality of the exemplary digital images. Information region 770 displays information including location coordinates of the hotspot and distance and direction from the user's current location. Alternately, other types of location information can be displayed, such as street address which has been converted from the latitude and longitude coordinate data. Information region 775 displays information about the number of digital images captured at this hotspot as used in the importance ranking about the number of digital images taken at the hotspot location. Information Region 780 shows additional nearby hotspot locations where these users have also captured digital images. Information about other hotspots having digital images by these users is received by submitting an SQL query to database 310 of the online photo-management service 300. Navigation buttons 785 labeled "Go" allow the user to display information about these nearby hotspots on the screen using GUI screen 750.

Button 790 labeled "Ignore this hotspot" enables the user to mark this hotspot as 'to-be-ignored' as previously described above. The user's preference to ignore this hotspot location is stored either in local storage memory on the camera or is transmitted to online photo-management service 300 for storage in database 310. Ignored hotspot locations are not presented to the user on GUI screen 700 or in region 780 of GUI screen 750. Button 795 labeled "Exit" navigates back to GUI screen 700.

The invention has been described in detail with particular reference to certain preferred embodiments thereof, but it will be understood that variations, combinations, and modifications of the detailed embodiments can be effected within the spirit and scope of the invention.

PARTS LIST

- 100 Digital camera
- 110 Processor
- 120 Removable memory card
- 125 Internal storage memory
- 130 Internal memory
- 140 Display
- 150 Audio Speaker
- 160 Image Sensor
- 170 GPS receiver module
- 180 Network communication module
- 200 Network
- 300 Online photo-management service
- 310 Database
- 311 Table
- 312 Table
- 313 Table
- 314 Table
- 315 Table
- 316 Table
- 320 Processor
- 330 Storage memory
- 400 Computer access device
- 410 Storage memory
- 420 Processor
- 500 Process
- 510 Step
- 520 Step
- 530 Step
- 540 Decision block
- 545 Decision block
- 550 Step
- 560 Step
- 570 Step
- 580 Step
- 600 Process
- 610 Step
- 615 Decision block
- 620 Step
- 630 Step
- 650 Step
- 660 Step
- 665 Step
- 670 Decision block
- 680 Step
- 690 Step
- 700 GUI screen
- 705 map region
- 710*a* Scrolling navigation buttons
- 710*b* Scrolling navigation buttons
- 710*c* Scrolling navigation buttons
- 710*d* Scrolling navigation buttons
- 715 Zoom navigation buttons
- 720 Location icon
- 725*a* Hotspot icon
- 725*b* Hotspot icon
- 725*c* Hotspot icon
- 750 GUI screen
- 760 Digital image region
- 765 Information region
- 770 Information region
- 775 Information region
- 780 Information region
- 785 Navigation buttons
- 790 Button
- 795 Button
- 1000 Process
- 1010 Step
- 1020 Step
- 1030 Step
- 1040 Step
- 1050 Decision block
- 1055 Step
- 1060 Step
- 1070 Decision block
- 1100 Process
- 1105 Step
- 1110 Step
- 1115 Step
- 1120 Decision block
- 1125 Step
- 1130 Step
- 1135 Decision block
- 1140 Decision block
- 1145 Step
- 1150 Step
- 1155 Decision block
- 1160 Step
- 1165 Decision block
- 1200 Step
- 1210 Step
- 1220 Step

The invention claimed is:

1. A computing device comprising:
   a processor;
   a network communication port configured to facilitate communication between the processor and a plurality of portable communication devices;
   a computer-readable medium having stored thereon instructions executable by the processor to cause the computer to perform functions comprising:
   receiving location data from any of the plurality of portable communication devices, wherein the location data is indicative of one or more capture locations, and wherein each of the capture locations represents a geographic location at which one of the plurality of portable communication devices captured a digital photograph;
   storing the capture locations indicated by the received location data and, for each capture location, at least one of an associated capture date or an associated upload date;

determining a prior date range;

identifying a subset of the stored capture locations, wherein, for each of the capture locations in the subset of the stored capture locations, at least one of the associated capture date or the associated upload date is within the prior date range;

determining a regional count representing a number of the subset of the stored capture locations within a regional radius of a potential hotspot location;

determining a hotspot count representing a number of the subset of the stored capture locations that are within a hotspot radius from the potential hotspot location, wherein the hotspot radius is smaller than the regional radius; and identifying a hotspot location based on a comparison of the regional count and the hotspot count for the potential hotspot location.

2. The computing device of claim 1, wherein the functions further comprise:

determining that a current location of a particular portable communication device of the plurality of portable communication devices is within a predetermined threshold distance from the identified hotspot location; and transmitting notification data to the particular portable communication device, wherein the notification data indicates that the particular portable communication device is near the identified hotspot location.

3. The computing device of claim 2, wherein the notification data includes directional information from the current location of the particular portable communication device to the identified hotspot location.

4. The computing device of claim 3, wherein the directional information is selected from the group consisting of: information identifying a geographic direction to the identified hotspot location, information identifying a distance from said one of the plurality of portable communication devices to the identified hotspot location, audio data for playback on a speaker, descriptive text data for display on a display screen, numerical coordinate data for display on the display screen, and map image data for display on the display screen.

5. The computing device of claim 2, wherein the received location data comprises current locations for one or more portable communication devices of the plurality of portable communication devices, and wherein the determining that the current location of the particular portable communication device is within the threshold distance from the identified hotspot location comprises comparing the received current locations for the one or more portable communication devices.

6. The computing device of claim 2, wherein the functions further comprise:

receiving digital photographs, wherein each digital photograph was captured at one of the capture locations;

storing the received digital photographs;

associating each of the stored digital photographs with the stored capture location at which the digital photograph was captured; and identifying a subset of the stored digital photographs, wherein the subset of digital photographs is identified based at least in part on each of the subset of stored digital photographs being associated with a captured location that is (i) a second predefined distance from the identified hotspot location and is (ii) one of the identified subset of stored capture locations.

7. The computing device of claim 6, wherein the functions further comprise transmitting a digital photograph of the identified subset of stored digital photographs to the particular portable communication device.

8. The computing device of claim 6, wherein the stored digital photographs are associated with user-information indicative of a user-identifier for each respective stored digital photograph, and wherein the functions further comprise:

grouping two or more of the user-identifiers into user-groups;

determining a particular user-group associated with the particular portable communication device;

filtering the identified subset of digital photographs according to the user-information to produce a filtered subset of digital photographs containing only digital photographs that have user-identifiers in the particular user-group; and transmitting at least one digital photograph of the filtered subset of digital photographs to the particular portable communication device.

9. The computing device of claim 1, wherein the functions further comprise:

receiving, at the computing device, digital photographs captured at one of the capture locations; and storing the received digital photographs such that each of the stored digital photographs is digitally associated with the stored capture location at which the digital photograph was captured.

10. The computing device of claim 1, wherein the functions further comprise:

determining, for each of the one or more capture locations, a source device of the plurality of portable communication devices from which the capture location was received; and storing indications of the source device associated with each capture location.

11. The computing device of claim 1, wherein the functions further comprise:

receiving group information indicative of a user-group, wherein the user-group comprises indications of at least two of the plurality of portable communication devices;

associating each of one or more received capture locations with the user-group based on whether the capture location was received from a portable communication device indicated by the user-group;

determining that the user-group comprises an indication of the particular portable communication device;

filtering the identified subset of the stored capture locations according to the group information to produce a filtered subset of capture locations including capture locations associated with the user-group; and determining, based at least in part on the filtered subset of capture locations, a group-specific hotspot location.

12. The computing device of claim 11, wherein the functions further comprise:

determining that a current location of the particular portable communication device is within a predetermined threshold distance from the hotspot location; and transmitting notification data to the particular portable communication device, wherein the notification data indicates that the particular portable communication device is near the hotspot location, wherein the notification data is only transmitted to the particular portable communication device in response to determining that the hotspot location is the group-specific hotspot location.

13. A non-transitory computer-readable medium having stored thereon instructions executable by a processor to cause the processor to perform functions, the functions comprising:

receiving location data from any of a plurality of portable communication devices, wherein the location data is indicative of one or more capture locations, and wherein each of the capture locations represents a geographic location at which one of the plurality of portable communication devices captured a digital photograph;

storing the capture locations indicated by the received location data and, for each capture location, at least one of an associated capture date or an associated upload date;

determining a prior date range;

identifying a subset of the stored capture locations, wherein, for each of the capture locations in the subset of the stored capture locations, at least one of the associated capture date or the associated upload date is within the prior date range;

determining a regional count representing a number of the subset of the stored capture locations within a regional radius of a potential hotspot location;

determining a hotspot count representing a number of the subset of the stored capture locations that are within a hotspot radius from the potential hotspot location, wherein the hotspot radius is smaller than the regional radius; and identifying a hotspot location based on a comparison of the regional count and the hotspot count for the potential hotspot location.

14. The non-transitory computer-readable medium of claim 13, wherein the functions further comprise:

determining that a current location of a particular portable communication device of the plurality of portable communication devices is within a predetermined threshold distance from the identified hotspot location; and transmitting notification data to the particular portable communication device, wherein the notification data indicates that the particular portable communication device is near the identified hotspot location.

15. The non-transitory computer-readable medium of claim 14, wherein the functions further comprise:

receiving digital photographs, wherein each digital photograph was captured at one of the indicated capture locations;

storing the received digital photographs with the stored capture location at which the digital photograph was captured; and identifying a stored digital photograph, based at least in part on the identified stored digital photograph being associated with a capture location that is (i) a second predefined distance from the identified hotspot location and is (ii) one of the identified subset of stored capture locations.

16. The non-transitory computer-readable medium of claim 13, wherein the functions further comprise:

receiving group information indicative of a user-group, wherein the user-group comprises indications of at least two portable communication devices;

associating a received capture location with the user-group based on the capture location being received from a portable communication device indicated by the user-group;

determining that the user-group comprises an indication of the particular portable communication device;

filtering the identified subset of stored capture locations according to the group information to produce a filtered subset of capture locations including only capture locations associated with the user-group; and determining, based at least in part on the filtered subset of capture locations, a group-specific hotspot location.

17. A method, comprising:

receiving, at a processor via a network communication port, location data from any of a plurality of portable communication devices, wherein the location data is indicative of one or more capture locations, and wherein each of the capture locations represents a geographic location at which one of the plurality of portable communication devices captured a digital photograph;

storing, in a computer-readable medium, the capture locations indicated by the received location data and, for each capture location, at least one of an associated capture date and an associated upload date;

determining a prior date range at the processor;

identifying, by the processor, a subset of the stored capture locations, wherein, for each of the capture locations in the subset of the stored capture locations, at least one of the associated capture date and the associated upload date is within the prior date range;

determining, by the processor, a regional count representing a number of the subset of the stored capture locations within a regional radius from a potential hotspot location;

determining, by the processor, a hotspot count representing a number of the subset of the stored capture locations that are within a hotspot radius from the potential hotspot location, wherein the hotspot radius is smaller than the regional radius; and identifying, by the processor, a hotspot location based on a comparison of the regional count and the hotspot count for the potential hotspot location.

18. The method of claim 17, further comprising:

determining that a current location of a particular portable communication device of the plurality of portable communication devices is within a predetermined threshold distance from the identified hotspot location; and transmitting notification data to the particular portable communication device, wherein the notification data indicates that the particular portable communication device is near the identified hotspot location.

19. The method of claim 18, further comprising:

receiving digital photographs, wherein each digital photograph was captured at one of the indicated capture locations;

storing the received digital photographs such that each digital photograph is digitally associated with the stored capture location at which the digital photograph was captured; and identifying a stored digital photograph, based at least in part on the identified stored digital photograph being associated with a capture location that is (i) a second predefined distance from the identified hotspot location and is (ii) one of the identified subset of stored capture locations.

20. The method of claim 17, further comprising:

receiving group information indicative of a user-group, wherein the user-group comprises indications of at least two of the plurality of portable communication devices;

associating a received capture location with the user-group based on the capture location being received from a portable communication device indicated by the user-group;

determining that the user-group comprises an indication of the particular portable communication device;

filtering the identified subset of stored capture locations according to the group information to produce a filtered subset of capture locations including only capture locations associated with the user-group; and determining, based at least in part on the filtered subset of capture locations, a group-specific hotspot location.

* * * * *

UNITED STATES PATENT AND TRADEMARK OFFICE
CERTIFICATE OF CORRECTION

PATENT NO. : 8,581,997 B2
APPLICATION NO. : 12/914310
DATED : November 12, 2013
INVENTOR(S) : Lahcanski et al.

It is certified that error appears in the above-identified patent and that said Letters Patent is hereby corrected as shown below:

In the Drawings

In Fig. 5, Sheet 7 of 10, for Tag "560", delete " 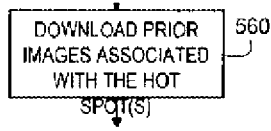 " and insert -- 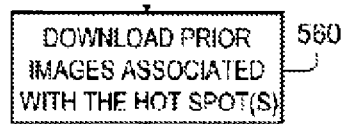 --, therefor.

In Fig. 6, Sheet 8 of 10, for Tag "690", delete " 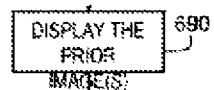 " and insert --  --, therefor.

In the Specifications

In Column 2, Line 9, delete "data determining" and insert -- data, determining --, therefor.

In Column 3, Line 45, delete "present to" and insert -- present --, therefor.

In Column 4, Line 59, delete "from to the global" and insert -- from the global --, therefor.

In Column 4, Line 63, delete "UPS" and insert -- GPS --, therefor.

Signed and Sealed this
Twenty-ninth Day of April, 2014

Michelle K. Lee
*Deputy Director of the United States Patent and Trademark Office*